US011286975B2

(12) United States Patent
Schaumann et al.

(10) Patent No.: US 11,286,975 B2
(45) Date of Patent: Mar. 29, 2022

(54) BALL STUD AND METHOD OF MANUFACTURING A BALL STUD

(71) Applicant: THK Rhythm Automotive GmbH, Duesseldorf (DE)

(72) Inventors: Lothar Schaumann, Duesseldorf (DE); Harald Walter, Duesseldorf (DE)

(73) Assignee: THK Rhythm Automotive GmbH, Duesseldorf (DE)

( * ) Notice: Subject to any disclaimer, the term of this patent is extended or adjusted under 35 U.S.C. 154(b) by 0 days.

(21) Appl. No.: 17/237,123

(22) Filed: Apr. 22, 2021

(65) Prior Publication Data
US 2021/0332844 A1    Oct. 28, 2021

(30) Foreign Application Priority Data

Apr. 24, 2020  (DE) ............... 10 2020 111 280.7

(51) Int. Cl.
*F16C 11/06*    (2006.01)
*B21D 39/04*    (2006.01)

(52) U.S. Cl.
CPC ........ *F16C 11/0609* (2013.01); *B21D 39/048* (2013.01)

(58) Field of Classification Search
CPC ............... F16C 11/0609; F16C 11/0614; F16C 11/0628; B21D 39/048; B21D 53/84; B21D 17/025; B21H 1/00; B60Q 1/0683
See application file for complete search history.

(56) References Cited

U.S. PATENT DOCUMENTS

| | | | |
|---|---|---|---|
| 6,004,037 A | 12/1999 | Harris et al. | |
| 6,009,734 A * | 1/2000 | Augustin | B21D 17/025 72/58 |
| 6,244,735 B1* | 6/2001 | Burton | B60Q 1/0683 362/421 |
| 2008/0304902 A1* | 12/2008 | Buchner | F16C 11/0614 403/76 |
| 2015/0273966 A1* | 10/2015 | Nilsson | F16C 11/0628 403/132 |

FOREIGN PATENT DOCUMENTS

| | | | | |
|---|---|---|---|---|
| CN | 209083804 U | * | 7/2019 | |
| DE | 69 02 263 U | | 5/1969 | |
| DE | 69 02 265 U | | 5/1969 | |
| DE | 19834677 A1 | * | 2/2000 | ............. B60G 7/005 |
| DE | 699 29 554 T2 | | 11/2006 | |
| EP | 3608552 B1 | * | 2/2021 | .......... F16C 11/0614 |

OTHER PUBLICATIONS

Strauch, DE-19834677-A1 Machine translation (Year: 2000).*
Walter, EP3608552-B1 Machine translation (Year: 2021).*
Lin, CN-209083804-U Machine translation (Year: 2019).*

* cited by examiner

*Primary Examiner* — Lee A Holly
(74) *Attorney, Agent, or Firm* — McNees Wallace & Nurick LLC

(57) ABSTRACT

A ball joint includes a carrier part and a hollow ball which is a component separate from the carrier part and is fixed on the carrier part.

16 Claims, 11 Drawing Sheets

BALL STUD AND METHOD OF MANUFACTURING A BALL STUD

This invention relates to a ball stud for a ball joint and to a method of manufacturing a ball stud.

BACKGROUND OF THE INVENTION

Ball joints are generally known components. They have a housing in which the ball stud is received in such a way that it is pivotable relative to the housing to a limited extent about the center of a spherical bearing surface.

The bearing surface is formed by the surface of a more or less complete ball on which a stud is mounted. The stud serves for attachment to another component. When the stud extends only from one side of the ball, the spherical surface can be present completely in the remaining areas. If the stud extends through the ball, so that it protrudes from both sides of the ball, the ball "shrinks" to a spherical layer.

For the sake of simplicity, reference will subsequently be made to a ball regardless of the respective special geometry, which comprises all geometrical bodies that have a surface with a single center of curvature.

Typical applications of ball joints in which the ball studs of the invention can be used include the movable connection of components of running gears of motor vehicles, for example the connection of longitudinal or transverse control arms to wheel carriers or to the vehicle body.

In the prior art, ball studs are manufactured in one piece (i.e. the ball together with the stud) as turned parts made of rod material. This results in a high loss of material, as in the area of the stud a lot of material must be removed. This involves an excessively high use of material as well as time and costs for the necessary machining work.

Another disadvantage consists in that a surface treatment which is required with regard to the hardness and wear resistance of the ball surface necessarily also involves the stud.

It is the object of the invention to improve the manufacturability of the ball stud to such an extent that a reduced manufacturing expenditure is obtained.

BRIEF DESCRIPTION OF THE INVENTION

In accordance with the invention, a ball stud for a ball joint is provided to achieve this object, comprising a carrier part and a hollow ball which is a component separate from the carrier part and is fixed on the carrier part. Furthermore, a method of manufacturing a ball stud is provided to achieve this object, in which a carrier part and a hollow ball are provided, and subsequently the hollow ball is fixed on the carrier part.

The invention is based on the fundamental idea to no longer fabricate the ball stud in one piece, but from two separate components, namely the hollow ball and the carrier part. The hollow ball is that component which provides the spherical bearing surface. The carrier part is that component which serves for the transmission of forces and for the connection to another component. A ball stud composed of two separate components provides a number of advantages:

The machining expenditure is distinctly reduced, as there can be used blanks adapted in their basic dimensions, which require little machining work (in the case of the hollow ball) or no machining work at all (in the case of the carrier part). The resulting advantage in terms of time and cost outweighs the expenditure required for the step of mounting the two components to each other.

The hollow ball and the carrier part can be made of different materials adapted to the respective requirements. In particular, the material usage for a high-strength material can be limited to the hollow ball, as only said hollow ball requires a particular surface hardness and wear resistance. For the carrier part, a material having lower strengths and possibly also a lower weight can be used.

A surface treatment as it is necessary for the ball surface is limited to a relatively small component, namely the hollow ball, which can be incorporated into a corresponding treatment process with a very much higher packing density, as no stud is present. For the carrier part, on the other hand, a distinctly less expensive treatment process can be used, as far as this is necessary. For example, the hollow ball can be gas-nitrided, while for the carrier part a zinc-nickel coating is applied.

The carrier part can be of hollow design, which results in a low weight and a low material usage.

According to a preferred embodiment of the invention, the carrier part is cylindrical so that a cylindrical ball stud is obtained without any further aftertreatment.

In order to firmly fix the hollow ball on the carrier part in an axial direction, it can be provided that the carrier part has a larger outside diameter on both sides of the hollow ball than in the area in which the hollow ball is arranged. Due to the difference in the outside diameter, an abutment surface effective in the axial direction is created for the hollow ball so that the same is supported reliably.

The different diameters can be achieved by widening a hollow carrier part in a radial direction. As a result, an internal-high-pressure forming method can be used, for example.

It is also possible that the carrier part is upset in the radial direction so that the outside diameter is reduced. Subsequently, the carrier part can be upset again on one side.

It is also possible that the carrier part is upset in the axial direction so that the hollow carrier part experiences an increase in diameter outside the hollow ball in the radial direction, and a press fit is obtained in the area of the hollow ball.

According to another alternative it is possible that the carrier part is roller-burnished so that a bead clamping the hollow ball is produced.

In all embodiments, the abutment surface effective in the radial direction is stable enough to absorb the acting axial forces. To prevent the hollow ball from rotating on the carrier part, it can be provided that the hollow ball is arranged on the carrier part with a press fit. The same can be joined in the axial direction with correspondingly high forces. Alternatively, the hollow ball can be heated and/or the carrier part can be cooled in order to create a joining gap.

To firmly anchor the hollow ball on the carrier part both in the axial direction and in the circumferential direction, it can be provided that the hollow ball includes radially protruding material portions that are buried in the material of the carrier part. This results in a form fit.

It can be provided that the hollow ball is plastically deformed in order to produce a plurality of material portions penetrating into the carrier part. In particular, this can be effected with little effort by a crimping process by which small material protrusions are thrown up at several points spaced apart from each other in the circumferential direction, which dig into the material of the carrier part.

In principle, it is also possible to cohesively attach the hollow ball and the carrier part to each other. For example, the hollow ball can be soldered to the carrier part. Alternatively, it is also possible to adhesively bond the two parts to each other.

BRIEF DESCRIPTION OF THE DRAWINGS

The invention will be described below with reference to various embodiments that are illustrated in the attached drawings, in which.

DETAILED DESCRIPTION OF THE INVENTION

Figure 1B:
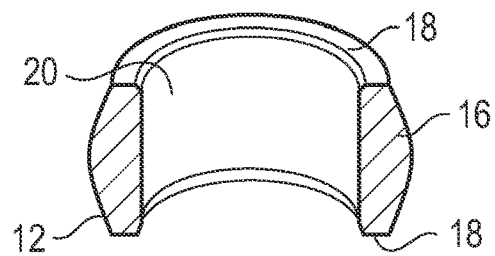
FIGS. 1a-1c in a perspective sectional view schematically show a ball stud according to the invention as well as the hollow ball and the carrier part for this ball stud.
Figure 1C:
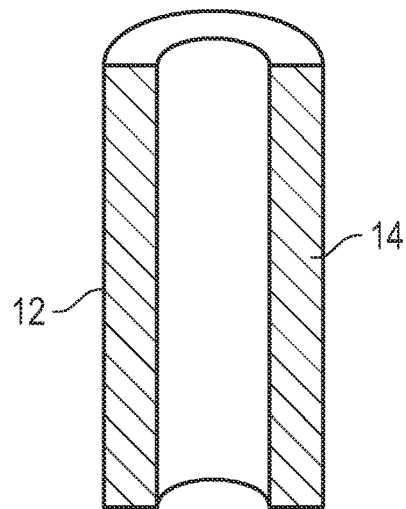
Figure 1A:
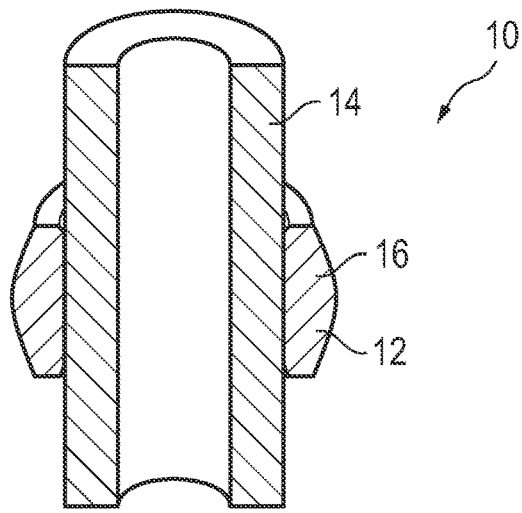

FIG. 1a shows a perspective sectional view of a ball stud 10 that includes a bearing surface 12 and a stud 14.

The bearing surface 12 is spherical (strictly speaking the surface of a spherical washer) and is provided to be received in a housing of a ball joint. It is formed by the outer surface of a hollow ball 16 which is shown in FIG. 1b.

The hollow ball 16 here is formed by a spherical washer with two end faces 18 through which a through opening extends in a direction perpendicular to the plane of the end faces 18 so that a cylindrical inner surface 20 is formed.

The stud 14 here is formed by a carrier part (see FIG. 1c) which in the illustrated embodiment is configured as a hollow cylinder with a cylindrical outer surface 22. The diameter of the outer surface 22 of the carrier part 14 approximately corresponds to the diameter of the inner surface 20 of the hollow ball 16.

As is shown in FIG. 1, the hollow ball 16 is firmly arranged on the carrier part 14. In this connection, "firmly" means that the connection between the hollow ball 16 and the carrier part 14 is capable of absorbing the forces acting along the middle axis of the carrier part 14 as well as a torque acting in the circumferential direction between the hollow ball 16 and the carrier part 14, without a relative movement occurring between the carrier part 14 and the hollow ball 16.

The firm connection between the carrier part 14 and the hollow ball 16 in principle can be produced in any suitable way. For example, a press fit can be produced between the carrier part 14 and the hollow ball 16. Alternatively or additionally, a form fit can be produced. For example, the carrier part 14 and/or the hollow ball 16 might be provided with a knurl which, when the press fit between the two components is produced, digs into the respective other component.

It is also possible to use a cohesive connection between the two components. For example, the two components can be soldered or adhesively bonded to each other.

As a material for the hollow ball 16 in particular steel is useful from a strength point of view. The hollow ball can be produced as a turned part. Alternatively, it is also possible that the hollow ball is pressed, roller-burnished and punched.

In a subsequent machining step a surface treatment is effected so that the desired properties of the bearing surface 12 are achieved, in particular as regards hardness and wear resistance. For example, the hollow ball 16 can be hardened or gas-nitrided.

The carrier part 14 can be manufactured starting from a drawn tube. The same can be made of steel or even less expensive materials. With regard to a low overall weight it is also possible to manufacture the carrier part 14 from a tube made of an aluminum alloy.

As far as a surface treatment is required in particular with regard to the corrosion resistance, the carrier part 14 is processed further correspondingly.

It is also conceivable that the carrier part 14 and/or the hollow ball 16 is made of a plastic material, a CFC composite material or the like. It is also conceivable to manufacture the hollow ball 16 from ceramics.

It is decisive that the respective material pairing is chosen such that the hollow ball 16 is optimally adapted to the loads acting on the same, while the carrier part 14 is optimally adapted to the loads acting on the same.

With reference to FIGS. 2a-2e a first method of connecting the carrier part 14 to the hollow ball 16 will be explained below.

Figure 2A:
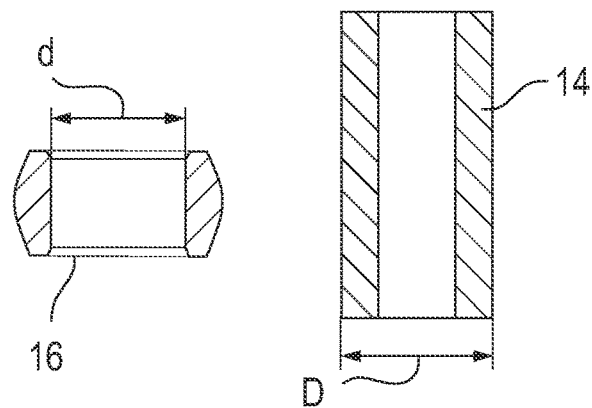
FIGS. 2a-2e schematically show the steps of a method of manufacturing a ball stud according to a first embodiment of the invention.
Figure 2B:
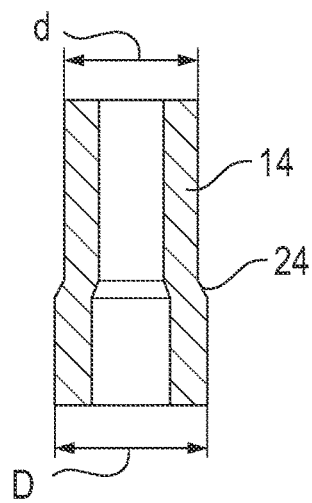
Figure 2C:
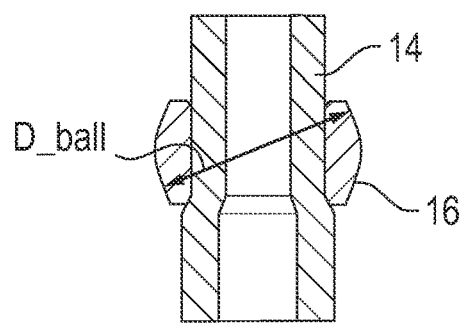

FIG. 2a shows the carrier part 14 and the hollow ball 16, which are manufactured as separate components and possibly are surface-treated correspondingly. The carrier part 14 has an outside diameter D which is greater than the inside diameter d of the hollow ball 16.

In a second method step (see FIG. 2b) the carrier part 14 is upset in a middle portion and an end portion (the upper region in FIG. 2b) so that the outside diameter of the carrier part 14 corresponds to the inside diameter d of the hollow ball 16. In this way, an abutment surface 24 effective in the axial direction is formed at the transition between the portions of different outside diameter.

In the next step (see FIG. 2c) the hollow ball 16 is arranged on the carrier part 14 in such a way that it rests against the abutment surface 24.

To fix the hollow ball 16 on the carrier part 14 in the circumferential direction, a press fit can be provided between the inner surface 20 of the hollow ball and the outer surface 22 of the carrier part. Depending on the concretely used diameter ratios, the two components 14, 16 can be brought to different temperatures for joining, or the hollow ball 16 can be pressed onto the carrier part 14 in the axial direction.

Instead of only a "smaller" diameter at the carrier part 14, it is also conceivable to use a double stepped form in which the diameter in the area of the seating surface is slightly greater for the hollow ball 16 than at the axial end with the smaller diameter. In this way, it is possible to reduce the distance along which the hollow ball 16 must be pushed with a high force when a press fit is to be produced.

Figure 2D:
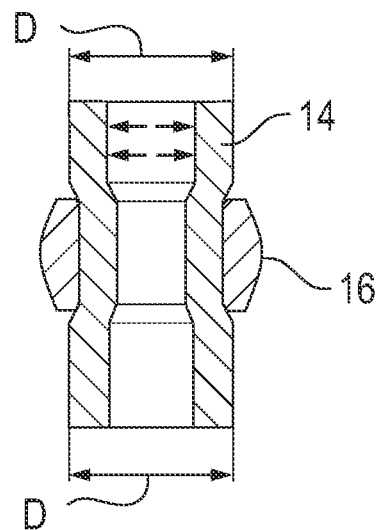

When the hollow ball 16 is positioned correctly, the axial end of the carrier part 14, which has the smaller diameter, is widened so that another abutment surface 24 is produced on the other side of the hollow ball 16 (see FIG. 2d).

To widen the carrier part 14, for example an expanding mandrel or an internal-high-pressure forming method can be used, in which the interior space of the carrier part 14 is widened by means of water or a hydraulic oil.

According to a design variant it is also possible to suitably mount the hollow ball 16 on the carrier part 14 (in particular by means of a press fit), which in the initial state has a constant outside diameter, and subsequently widen the two axial ends of the carrier part 14 at the same time so that the abutment surfaces 24 are formed, with which the hollow ball 16 is fixed on the carrier part 14 in the axial direction.

Figure 2E:
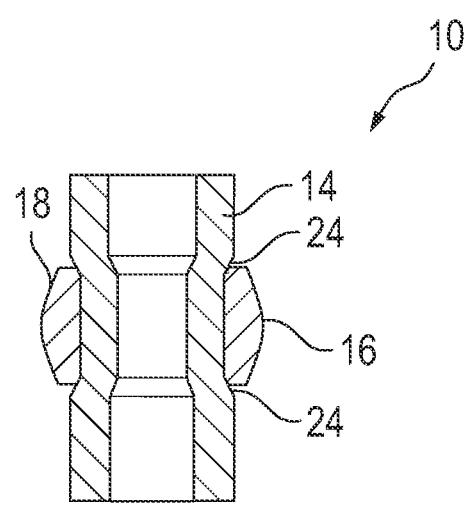
Figure 3A:
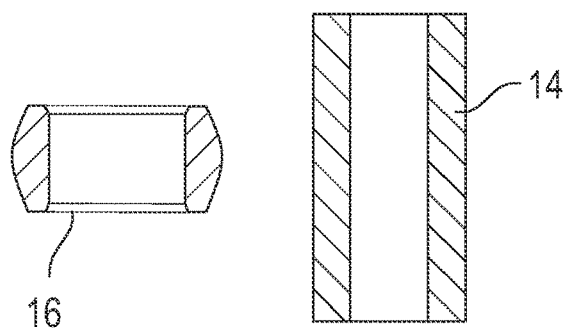
FIGS. 3a-3e schematically show the steps of a method of manufacturing a ball stud according to a second embodiment of the invention.
Figure 3B:
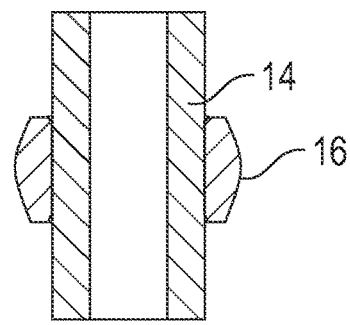
Figure 3C:
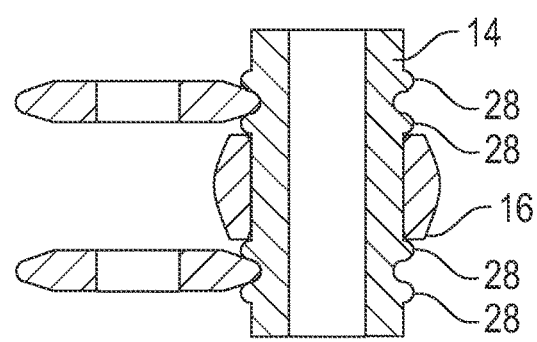
Figure 3D:
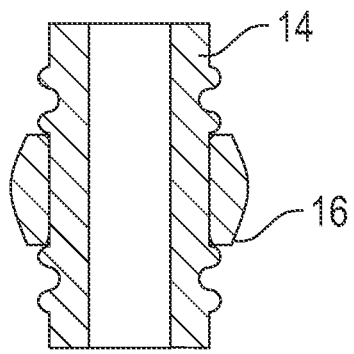
Figure 3E:
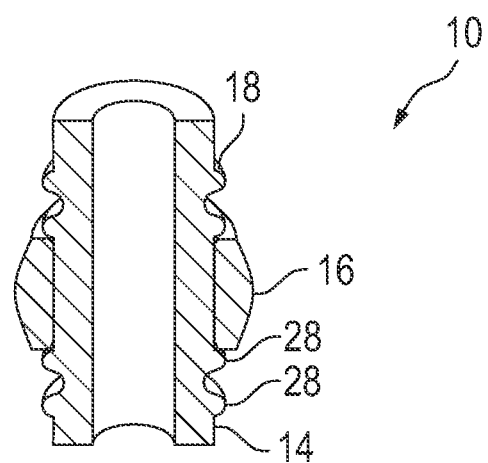

FIG. 2e shows the finished ball stud in which the hollow ball 16 is fixed between the two abutment surfaces 24. Due to the manufacturing method, the carrier part 14 must be made of a plastically deformable material, in particular steel.

With reference to FIGS. 3a-3e a second method of manufacturing the ball stud will be explained.

Here as well, the carrier part 14 and the hollow ball 16 are provided (see FIG. 3a), wherein in the second step the hollow ball 16 is arranged on the carrier part 14 which here has the same outside diameter throughout. The hollow ball 16 can also be fixed here again on the carrier part 14 by means of a press fit.

To positively fix the hollow ball 16 in the axial direction, the carrier part 14 is plastically deformed by roller-burnishing (see the two tools 26 in FIG. 3c) so that two beads 28 are thrown up from the material of the carrier part 14.

The two beads, which are located closer to the axial ends of the carrier part 14, are irrelevant with regard to the fixation of the hollow ball 16. The two other beads 28 are arranged in such a way (due to the positioning of the tools 26) that they engage the end faces 18 of the hollow ball 16 and fix the same on the carrier part 14 in the axial direction.

The carrier part 14 can be roller-burnished on both sides of the hollow ball 16 at the same time. Alternatively, the two tools 26 can engage the carrier part 14 one after the other. It is also possible to carry out a first roller-burnishing step, before the hollow ball 16 is arranged on the carrier part 14. In this way, similar to the method shown in FIG. 2, an axial abutment surface is produced, which serves for positioning the hollow ball 16 on the carrier part 14. Subsequently, the second roller-burnishing step can be performed.

In this embodiment, too, the carrier part 14 must be made of a plastically deformable material.

In FIGS. 4a-4e, a third method of manufacturing the ball stud is shown.

FIG. 4a again shows the carrier part 14 and the hollow ball 16, which are manufactured and provided separately from each other.

Figure 4A:
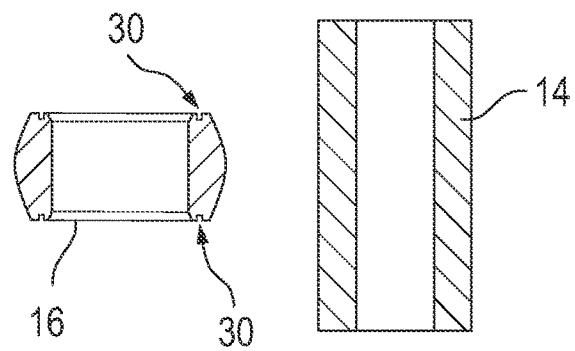
FIGS. 4a-4e schematically show the steps of a method of manufacturing a ball stud according to a third embodiment of the invention.
Figure 4B:
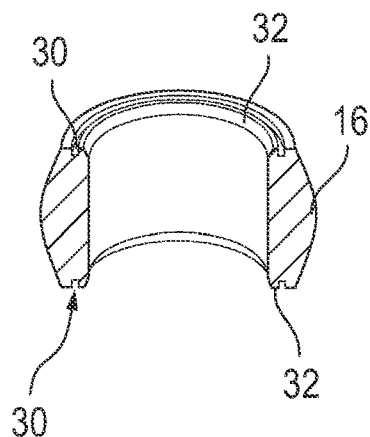
Figure 4C:
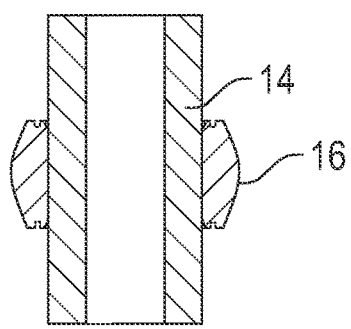
Figure 4D:
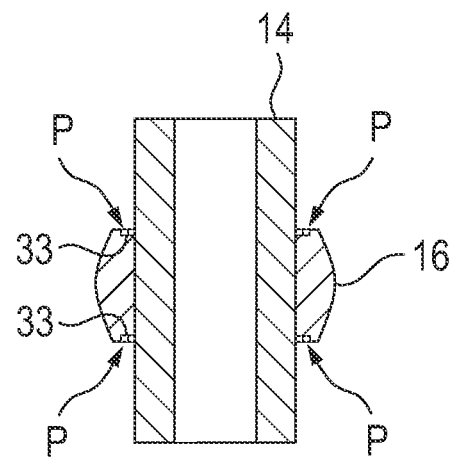
Figure 4E:
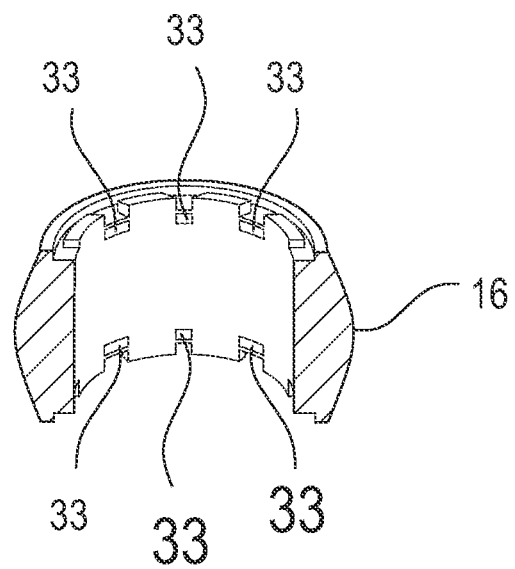
Figure 5A:
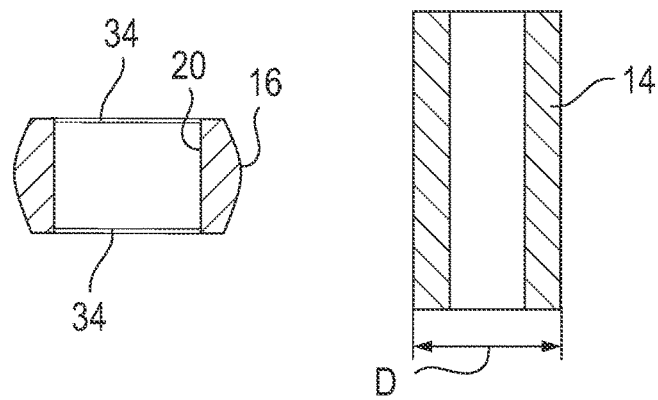
FIGS. 5a-5e schematically show the steps of a method of manufacturing a ball stud according to a fourth embodiment of the invention.
Figure 5B:
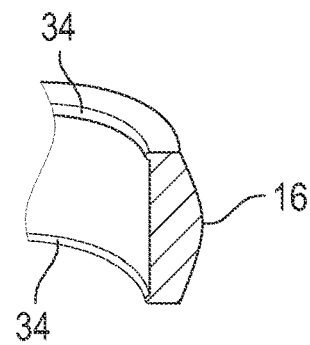
Figure 5C:
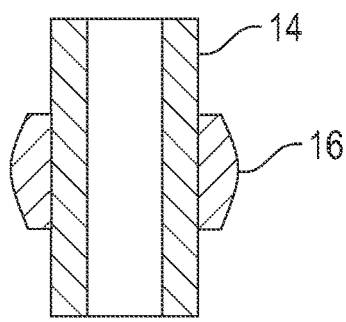
Figure 5D:
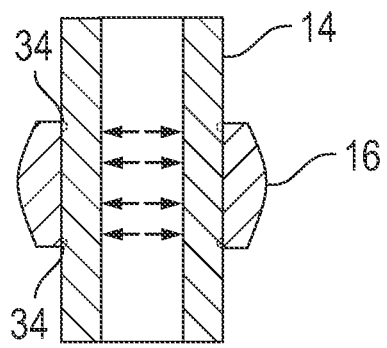
Figure 5E:
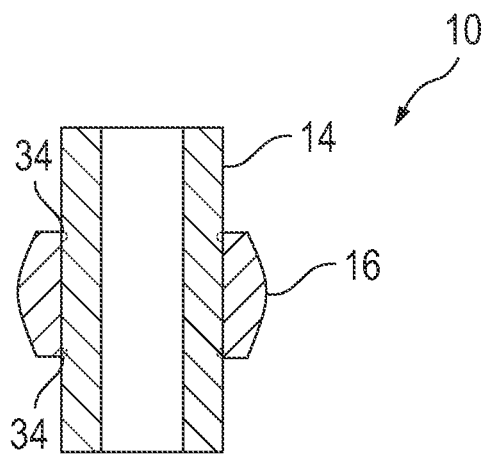

The hollow ball 16 here has a groove 30 in each of its two end faces 18 (see in particular FIG. 4b).

For assembly, the hollow ball 16 again is arranged on the carrier part 14 (see FIG. 4c), wherein a press fit can be used here as well in order to position the hollow ball 16 on the carrier part 14 in the axial direction.

In a next step (see FIG. 4d) the web 32 of the hollow ball 16 located radially inside the two grooves 30 is crimped at several points spaced apart from each other in the circumferential direction (see the arrows P in FIG. 4d) so that material is also displaced there in the radial direction. This results in tooth-like ribs 33 (see FIG. 4e) that press or dig into the material of the carrier part 14. As a result, the hollow ball 16 is fixed on the carrier part 14 both in axial direction and in circumferential direction.

In this embodiment, it is not necessary for the carrier part 14 to be plastically deformable to the same extent as in the preceding embodiments.

FIGS. 5a-5e show a fourth method of manufacturing the ball stud 10.

In this embodiment, the hollow ball 16 does not have a smooth inner surface 20 throughout, but is provided with an inwardly protruding bead 34 at each of its axial ends (adjacent to the end faces 18).

The hollow ball 16 is arranged on the carrier part 14, wherein here again a press fit can be used to position the hollow ball 16 on the carrier part 14. Subsequently, the carrier part 14 is widened to the outside in the radial direction at least in its middle portion, in which the hollow ball 16 is disposed on the outside, so that the outer surface 22 is pressed against the inner surface 20 of the hollow ball and the beads 34 of the hollow ball 16 press into the outer surface 22 of the carrier part 14 (see FIG. 5d). The hollow ball 16 thereby is fixed on the carrier part 14 (see FIG. 5e).

To increase the torque transmittable between the hollow ball 16 and the carrier part 14, it can be provided that the beads 34 are interrupted in the circumferential direction.

In this embodiment, it is again necessary for the carrier part 14 to be plastically deformable.

FIGS. 6a-6d show a fifth method of manufacturing the ball stud 10.

The fundamental difference between the fifth method and the preceding method consists in that in the fifth method the carrier part 14 is upset in the axial direction in order to fix the hollow ball 16 on the carrier part.

Figure 6A:
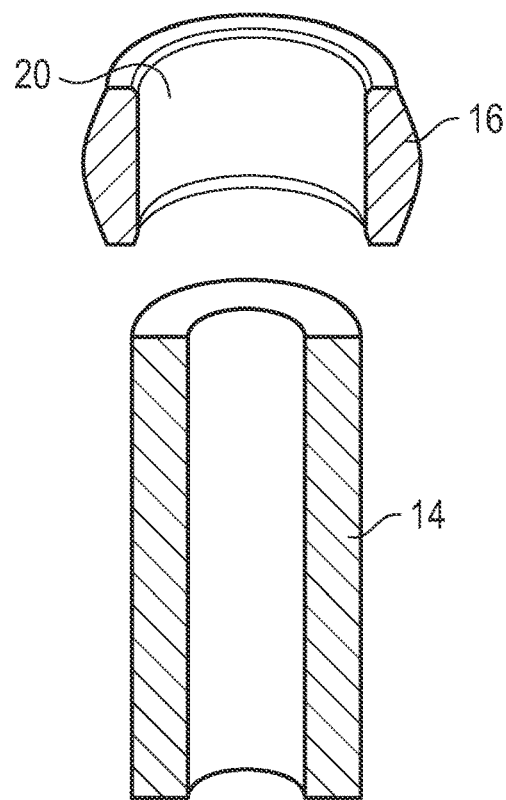
FIGS. 6a-6d schematically show the steps of a method of manufacturing a ball stud according to a fifth embodiment of the invention.
Figure 6B:
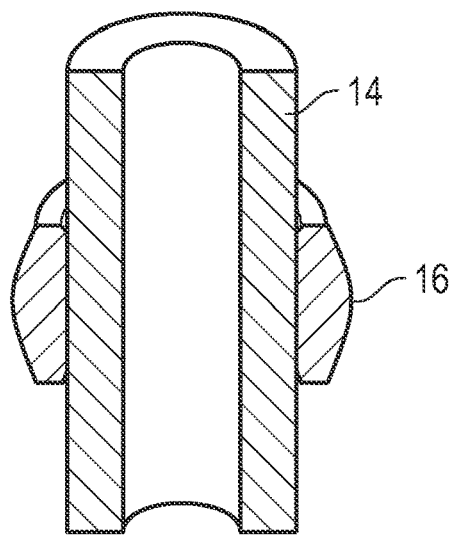
Figure 6C:
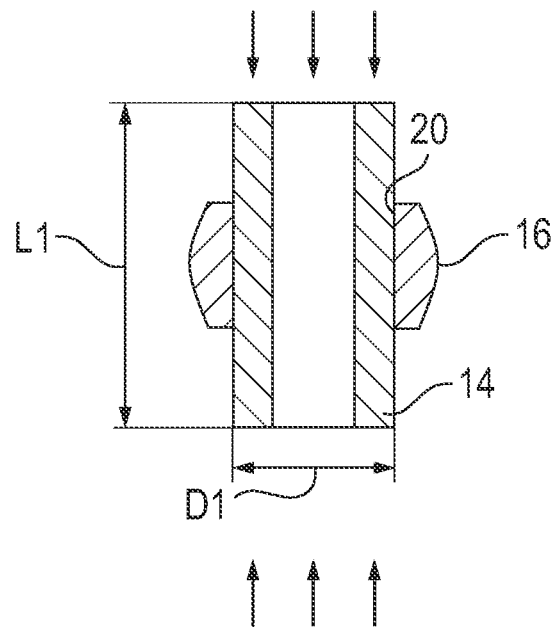

As can be seen in FIGS. 6a and 6b, the hollow ball 16 is pushed onto the carrier part 14 like in the preceding methods. The hollow ball 16 can be fixed on the carrier part 14 in the desired position by means of a press fit, or it is held on the carrier part in the desired position by means of a tool.

Figure 6D:
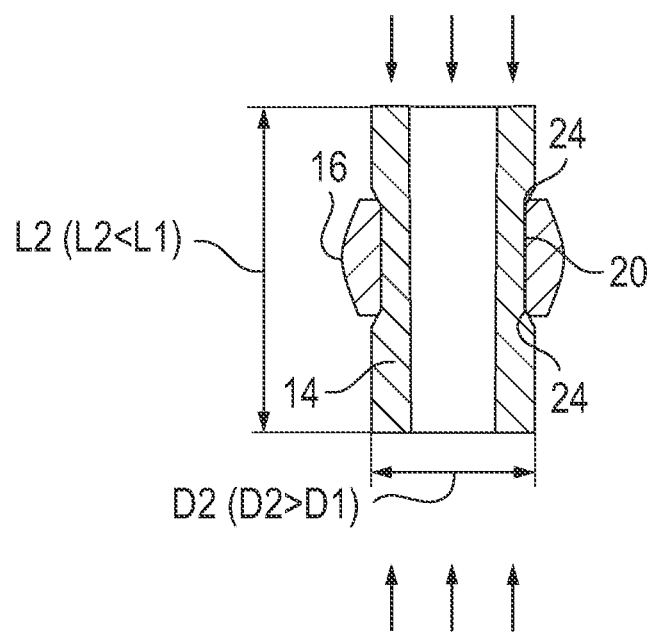

In a second step, the carrier part 14 is upset in the axial direction (see FIG. 6c), whereby the axial length of the carrier part is reduced from an initial length L1 to an upset length L2 (see FIG. 6d). During upsetting, the diameter of the carrier part is increased from an initial diameter D1 to an upset diameter D2 (see FIG. 6d).

This widening of the carrier part 14 in the area of the hollow ball 16 is limited by the diameter of its inner surface 20 so that in the area of the hollow ball the carrier part 14 (substantially) maintains the original diameter D1. Therefore, an abutment surface 24 effective in the axial direction is formed on both sides of the hollow ball 16, which fixes the hollow ball 16 in its axial position.

Although the diameter of the carrier part 14 in the area of the inner surface is not changed significantly during upsetting, a press fit with the inner surface 20 nevertheless is increased by upsetting or, if a clearance fit is present before upsetting, a press fit is produced so that the hollow ball 16 is frictionally secured against a relative rotation on the carrier part 14.

In the region of the abutment surfaces 24, the hollow ball 16 can be provided with designs such as a knurl or protrusions so that a form fit with the abutment surfaces 24 is produced, which fixes the hollow ball 16 in the circumferential direction and increases the transmittable torque.

The invention claimed is:

1. A ball stud for a ball joint, comprising:
   a carrier part; and
   a hollow ball which is a component separate from the carrier part and is fixed on the carrier part,
   wherein the hollow ball includes radially protruding material portions that are dug into a material of the carrier part.

2. The ball stud of claim 1, wherein the carrier part is hollow.

3. The ball stud of claim 1, wherein the carrier part is cylindrical.

4. The ball stud of claim 1, wherein on both sides of the hollow ball, the carrier part has an outside diameter larger than in an area in which the hollow ball is arranged.

5. The ball stud of claim 1, wherein a solder layer is arranged between the hollow ball and the carrier part.

6. The ball stud of claim 1, wherein the carrier part and/or the hollow ball is/are made of steel, aluminum or high-strength plastic material.

7. The ball stud of claim 1, wherein a wear resistance of a surface of the hollow ball is higher than a wear resistance of a surface of the carrier part.

8. A method of manufacturing a ball stud, the method comprising:
providing a carrier part;
providing a hollow ball; and
fixing the hollow ball on the carrier part,
wherein the carrier part is upset in an axial direction so that the carrier part experiences an increase in diameter in a radial direction outside the hollow ball and a press fit is obtained in an area of the hollow ball.

9. The method of claim 8, wherein the hollow ball is plastically deformed in order to produce a plurality of material portions penetrating into the carrier part.

10. The method of claim 9, wherein the hollow ball is crimped in the radial direction at a plurality of points spaced apart from each other in a circumferential direction.

11. The method of claim 8, wherein the carrier part and the hollow ball are exposed to a surface treatment in separate methods.

12. The method of claim 8, wherein the carrier part is plastically deformed in order to create an abutment surface for the hollow ball which is effective in the axial direction.

13. The method of claim 8, wherein the carrier part is widened by internal-high-pressure forming.

14. The method of claim 8, wherein the carrier part is upset in the radial direction.

15. The method of claim 8, wherein the carrier part is roller-burnished so that a bead clamping the hollow ball is thrown up.

16. A method of manufacturing a ball stud, the method comprising:
providing a carrier part;
providing a hollow ball; and
fixing the hollow ball on the carrier part,
wherein the hollow ball is plastically deformed in order to produce a plurality of material portions penetrating into the carrier part, and
wherein the hollow ball is crimped in the radial direction at a plurality of points spaced apart from each other in a circumferential direction.

* * * * *